(12) United States Patent
Alwan et al.

(10) Patent No.: US 11,780,505 B2
(45) Date of Patent: Oct. 10, 2023

(54) HYBRID CAST VEHICLE ASSEMBLY WITH STRUCTURAL REINFORCEMENTS

(71) Applicant: Ford Motor Company, Dearborn, MI (US)

(72) Inventors: Jamil M. Alwan, Ann Arbor, MI (US); Djamal Eddine Midoun, Ann Arbor, MI (US); Nathan Kristofor Tardif, Ferndale, MI (US); Sudip Sankar Bhattacharjee, Novi, MI (US); Petros Frantzeskakis, Canton, MI (US)

(73) Assignee: Ford Motor Company, Dearborn, MI (US)

( * ) Notice: Subject to any disclaimer, the term of this patent is extended or adjusted under 35 U.S.C. 154(b) by 66 days.

(21) Appl. No.: 17/544,177

(22) Filed: Dec. 7, 2021

(65) Prior Publication Data

US 2023/0174158 A1 Jun. 8, 2023

(51) Int. Cl.
| | |
|---|---|
| *B62D 21/15* | (2006.01) |
| *B62D 27/02* | (2006.01) |
| *B62D 29/00* | (2006.01) |
| *B62D 29/04* | (2006.01) |
| *B62D 27/06* | (2006.01) |
| *B60K 1/04* | (2019.01) |

(52) U.S. Cl.
CPC ......... *B62D 21/152* (2013.01); *B62D 27/023* (2013.01); *B62D 27/026* (2013.01); *B62D 27/065* (2013.01); *B62D 29/007* (2013.01); *B62D 29/008* (2013.01); *B62D 29/041* (2013.01); *B60K 1/04* (2013.01)

(58) Field of Classification Search
CPC .. B62D 21/152; B62D 27/023; B62D 27/065; B62D 29/041; B62D 29/007; B62D 25/2018
USPC ...... 296/203.01, 2, 193.09, 29, 30, 204, 198
See application file for complete search history.

(56) References Cited

U.S. PATENT DOCUMENTS

| | | | |
|---|---|---|---|
| 6,193,273 B1 | 2/2001 | Novak et al. | |
| 6,840,542 B2 | 1/2005 | Kim | |
| 8,424,960 B2 | 4/2013 | Rawlinson et al. | |
| 10,363,963 B2 * | 7/2019 | Someya | B62D 25/145 |

(Continued)

FOREIGN PATENT DOCUMENTS

| | | | | |
|---|---|---|---|---|
| CN | 105730512 B | * | 3/2019 | ............. B60R 21/34 |
| DE | 102008062006 | | 6/2010 | |

(Continued)

OTHER PUBLICATIONS

Automotive Industry Portal Marklines, BMW i3 aluminum chassis frame: Drive Module characteristics, Oct. 27, 2017, pp. 1-8.

(Continued)

*Primary Examiner* — Dennis H Pedder
(74) *Attorney, Agent, or Firm* — Burris Law, PLLC

(57) ABSTRACT

A hybrid structural assembly for a motor vehicle includes a casting and a structural inlay. The casting includes a plurality of structural components joined together in a casting process to form structural load paths and extending in a plurality of directions in a 3D space. The casting includes a cast-allowable alloy material. The structural inlay is secured to at least one of the structural components. The structural inlay includes a material having at least one of a higher ductility and a higher toughness than the cast-allowable alloy material.

19 Claims, 8 Drawing Sheets

(56) References Cited

U.S. PATENT DOCUMENTS

| | | |
|---|---|---|
| 11,001,304 B2 | 5/2021 | Moss et al. |
| 2019/0217380 A1 | 7/2019 | Kallas |
| 2021/0122223 A1 | 4/2021 | McCarron et al. |
| 2023/0099867 A1* | 3/2023 | Kemppainen .......... B62D 21/02 |
| | | 296/203.01 |

FOREIGN PATENT DOCUMENTS

| | | | | |
|---|---|---|---|---|
| DE | 102010006669 B4 * | 1/2020 | ........... | B62D 25/082 |
| WO | 2003042024 | 5/2003 | | |

OTHER PUBLICATIONS

Fox, Tesla Fremont to Soon Activate World's Largest Unibody Casting Machine in Mass Model Y Production, Tesmanian News, Aug. 13, 2020, pp. 1-7.

* cited by examiner

HYBRID CAST VEHICLE ASSEMBLY WITH STRUCTURAL REINFORCEMENTS

FIELD

The present disclosure relates to motor vehicle structures, and more particularly to motor vehicle structures configured for energy absorption from front-end impacts.

BACKGROUND

The statements in this section merely provide background information related to the present disclosure and not constitute prior art.

Vehicles are subjected to standardized legal requirements and public domain impact tests to determine energy absorption of vehicle components. For example, an offset impact test involve a vehicle encountering a deformable barrier at a 40% overlap with a front bumper of the vehicle. In another example, a front impact test involves a vehicle encountering a rigid barrier at 35 miles per hour. A shape and/or material of a vehicle component affect energy absorption of the vehicle component during the impact test.

The present disclosure addresses challenges related to energy absorption in motor vehicles.

SUMMARY

This section provides a general summary of the disclosure and is not a comprehensive disclosure of its full scope or all of its features.

In one form, a hybrid structural assembly for a motor vehicle includes a casting and a structural inlay. The casting includes a plurality of structural components joined together in a casting process to form structural load paths and extending in a plurality of directions in a 3D space. The casting further includes a cast-allowable alloy material. The structural inlay is secured to at least one of the structural components. The structural inlay includes a material having at least one of a higher ductility and a higher toughness than the cast-allowable alloy material.

In variations of the structural assembly of the above paragraph, which may be implemented individually or in any combination: the structural inlay is one of a steel material or a composite material; the structural inlay defines a flat plate configuration; the structural inlay is secured to the at least one structural component with one or more of: a mechanical fastener, an adhesive, a rivet, or a screw; the structural inlay is embedded or cast-in with the casting; the casting includes a front end of the motor vehicle and the plurality of structural components includes mid rails adapted to be secured to front rails, and the structural inlay is secured to a web of at least one of the mid rails; the casting includes a front end of the motor vehicle and the plurality of structural components includes a front dash cross member, and the structural inlay is secured to at least a portion of the front dash cross member; a portion of where the structural inlay is secured to the portion of the front dash cross member is also secured to one of a subframe rear mount or a battery cage; the casting includes a front end of the motor vehicle and the plurality of structural components includes a pair of front dash support members, and the structural inlay is secured between the front dash support members; the cast-allowable alloy material is one of an aluminum alloy, a fiber-reinforced aluminum, or a fiber-reinforced magnesium; and the structural inlay defines one of: an L-Shape, a curved shape, or a polygonal shape.

In another form of the present disclosure, a hybrid structural assembly for a motor vehicle includes a casting and at least one structural inlay. The casting includes a plurality of structural components joined together to form structural load paths and extending in a plurality of directions in a 3D space. The structural components include opposed mid rails joined to opposed shock towers, opposed torque boxes joined to the opposed shock towers, opposed rail kickdowns joined to the mid rails, and a front dash cross member extending between and configured to be joined to the opposed rail kickdowns. The at least one structural inlay is secured to at least one of the structural components. The structural inlay includes a material having a higher ductility and a higher toughness than a material of the casting.

In variations of the structural assembly of the above paragraph, which may be implemented individually or in any combination: the material of the casting is one of an aluminum alloy, a fiber-reinforced aluminum, or a fiber-reinforced magnesium; the structural inlay is one of a steel material or a composite material; the hybrid structural assembly includes structural inlays secured to each of the opposed mid rails and at least one structural inlay secured to the front dash cross member; and the structural inlay is embedded or cast-in with the casting.

In another form of the present disclosure, a hybrid structural assembly for a motor vehicle includes a casting and a structural inlay. The casting comprises a plurality of structural components joined together to form structural load paths and extending in a plurality of directions in a 3D space. The structural components include opposed mid rails joined to opposed shock towers, opposed torque boxes joined to the opposed shock towers, opposed rail kickdowns joined to the mid rails, and a front dash cross member extending between and configured to be joined to the opposed rail kickdowns. The structural inlays are secured to each of the opposed mid rails and at least one structural inlay is secured to the front dash cross member. The structural inlays include a material having a higher ductility and a higher toughness than a material of the casting.

In variations of the structural assembly of the above paragraph, which may be implemented individually or in any combination: the material of the casting is one of an aluminum alloy a fiber-reinforced aluminum, or a fiber-reinforced magnesium; and the structural inlays is one of a steel material or a composite material; a portion of where the structural inlay is secured to the front dash cross member is also secured to at least one subframe rear mount or a battery cage.

Further areas of applicability will become apparent from the description provided herein. It should be understood that the description and specific examples are intended for purposes of illustration only and are not intended to limit the scope of the present disclosure.

DRAWINGS

In order that the disclosure is well understood, there will now be described various forms thereof, given by way of example, reference being made to the accompanying drawings, in which.

Figure 1:
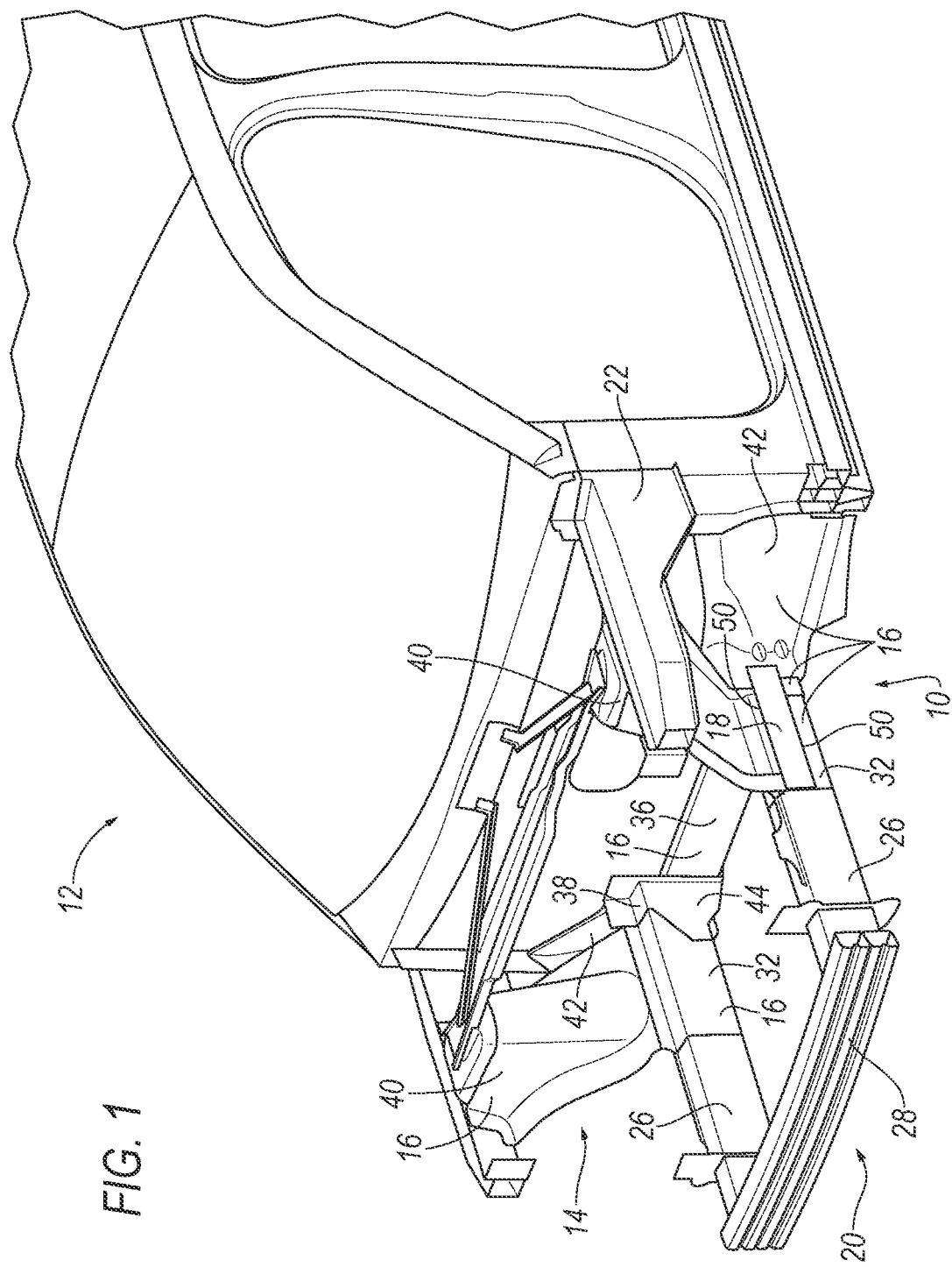
FIG. 1 is a partial perspective view of a motor vehicle to which the teachings of the present disclosure are applied.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a hybrid structural assembly 10 for a motor vehicle 12 according to the present disclosure includes a casting 14 including a plurality of structural components 16 joined together in a casting process to form structural load paths and extending in a plurality of directions in a three-dimensional (3D) space and a structural inlay 18 secured to at least one of the structural components 16. The casting 14 includes a cast-allowable alloy material. The structural inlay 18 includes a material having at least one of a higher ductility and a higher toughness than the cast-allowable alloy material.

Figure 2:
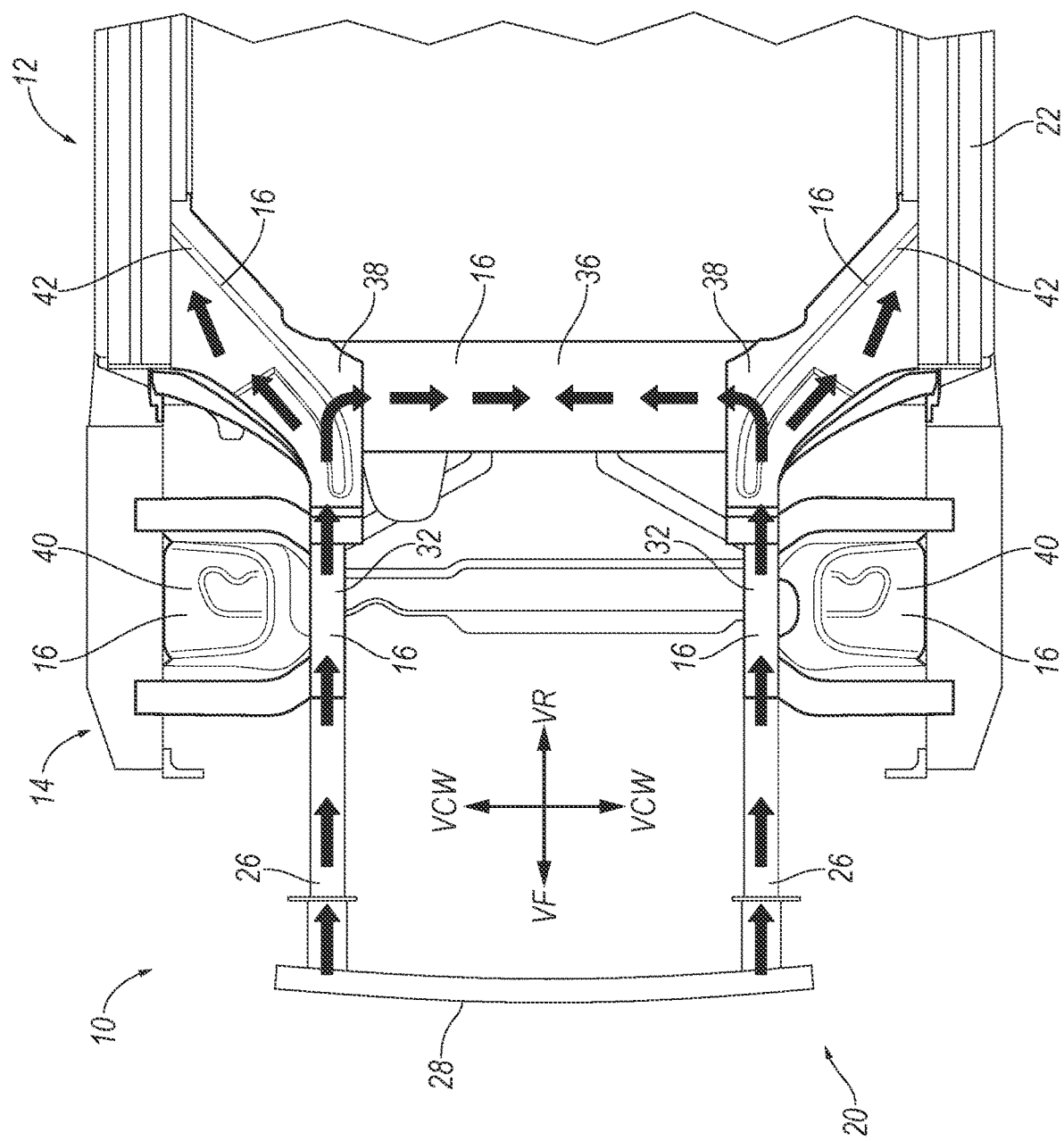
FIG. 2 is a plan view of a front end of the motor vehicle.

Referring also to FIGS. 2-3 and 5-6, the motor vehicle 12 includes a body 22 and a subframe 24. That is, the motor vehicle 12 is a unibody construction including the body 22 attached to the subframe 24. The body 22 includes a pair of rails 26 and a bumper beam 28 supported by the rails 26. In a front impact, the rails 26 transfer energy from the bumper beam to the rest of the body, as shown by the arrows in FIG. 2, and to the subframe 24, as shown by the arrows in FIG. 3. The rails 26, being directly connected to the bumper beam 28, are "front" rails 26. The subframe 24 is attached to a cross member of the body 22, and the subframe 24 transfers energy from the rails 26 to the cross member. The portion of the body 22 shown in the figures is a "front end" 20 of the vehicle 12, i.e., an end of the vehicle 12 frontmost relative to a center of the vehicle 12. The front end 20 of the vehicle 12 is thus a forwardmost portion of the vehicle 12 when the vehicle 12 is moving in a forward direction VF. Thus, as shown in FIG. 2, the vehicle 12 defines the vehicle-forward direction VF, a vehicle-rearward direction VR opposite the vehicle-forward direction VR, and a vehicle-crosswise direction VCW perpendicular to the forward VF and rearward VR directions. The body 22 includes the hybrid structural assembly 10 that connects to the front rails 26 and to the subframe 24.

The hybrid structural assembly 10 includes the casting 14. A "casting" 14 is a product that is manufactured by a casting process, i.e., by filling molten or semisolid material into a mold and then hardening the material into a shape defined by the mold. The casting 14 includes a plurality of structural components 16 joined together in the casting process. The plurality of structural components 16 form structural load paths and extend in a plurality of directions in a 3D space. That is, the casting process providing the casting 14 with modes of deformation and energy absorption throughout 3D space that absorbs energy more readily than forming each component 16 separately and joining them later. By forming the casting 14 with the casting process, the casting 14 increases uniformity of energy absorption characteristics throughout the components 16, improving energy absorption and reducing overall weight of the hybrid structural assembly 10. The casting process reduces machining of the components 16 upon forming the casting 14, reducing manufacturing time and costs.

The casting 14 is formed of a cast-allowable alloy material, i.e., a material that is able to be used in the casting process. As described above, the material used in the casting process is heated to a liquid or semisolid phase and then introduced to the mold to form the casting 14. The cast-allowable alloy material can be, e.g., one of an aluminum alloy, a fiber-reinforced aluminum, a fiber-reinforced magnesium, etc. The cast-allowable alloy material may have a lower weight, ductility, and/or toughness than other materials used in vehicle components. That is, the cast-allowable alloy material may be less ductile (i.e., less able to deform without breaking) and may have a lower toughness (i.e., less able to absorb energy prior to breaking) than other materials that are not able to be used in the casting process. The lower weight of the cast-allowable alloy reduces overall weight of the vehicle 12, improving fuel efficiency of the vehicle 12. The cast-allowable alloy eases manufacturing of the hybrid structural assembly 10 with the casting process, and materials used in other components provides ductility and toughness to absorb energy during vehicle impacts.

The casting 14 includes at least a portion of the front end 20 of the motor vehicle 12. That is, the casting 14 includes components 16 that are disposed at the front end 20 of the motor vehicle 12 between the rest of the body 22 and the subframe 24. For example, the structural components 16 can include a pair of mid rails 32, each mid rail 32 adapted to be secured to one of the front rails 26. The mid rails 32 connect the front rails 26 to the rest of the casting 14. The mid rail 32 transfers energy from the front rail 26 to the rest of the vehicle body 22. That is, the mid rail 32 is the connection of the casting 14 to the front rail 26, and is thus the first portion of the casting 14 that absorbs energy during the vehicle impact. Each mid rail 32 includes a web 34, i.e., an interior portion of the mid rail 32. The web 34 absorbs at least some energy that would otherwise be transferred from the front rail 26 to the rest of the casting 14.

Referring to FIGS. 1-7, in another example, the structural components 16 can include a front dash cross member 36 and a pair of rail kickdown gussets 38 that support the front dash cross member 36. The front dash cross member 36 is a component 16 that extends in a vehicle-crosswise direction VCW and connects to the mid rails 32 and to the subframe 24. The front dash cross member 36 absorbs energy from the mid rails 32 and transfers energy to the subframe 24. The front dash cross member 36 is a single piece, or alternatively is two pieces (not shown in the Figures). The rail kickdown gussets 38 connect the front dash cross member 36 to other portions of the casting 14. During the vehicle impact, the front dash cross member 36 reduces movement of the mid rails 32 and transfer energy from the mid rails 32 to the subframe 24.

As shown in FIG. 1, the structural components 16 can further include a pair of opposed shock towers 40. A "shock tower" 40 is a component 16 that stores at least a portion of a suspension. For example, the shock tower 40 can house a strut of a suspension. The shock towers 40 are disposed at each of the front wheels to house the respective suspension of each wheel. The mid rails 32 is joined to the opposed shock towers 40 in the casting 14. The mid rails 32 transmit energy from the front rails to the shock towers 40, such that the shock towers 40 absorb at least a portion of the energy from the vehicle impact. Casting the shock towers 40 improves manufacturing efficiency by reducing an amount of machining needed to form the front end 20 of the vehicle 12. That is, the shock towers 40 is shaped to house the strut and/or other parts of the suspension, and such a shape may use less machining in a casting process than another manufacturing process, e.g., stamping, forging, etc. Casting the shock towers 40 with the mid rails 32 improves energy absorption by the shock towers 40 compared to forming the shock towers 40 separately and then separately attaching the shock towers 40 to the mid rails 32 with, e.g., fasteners.

The structural components 16 can also include a pair of opposed torque boxes 42. A "torque box" 42 is a component that transfers energy from mid rails 32 to side and rear rails (not numbered) of the body 22. During the vehicle impact, the mid rails 32 absorb energy from the front rails 26 and transfer energy to the torque boxes 42. The torque boxes 42 then transfer energy to side rails, dissipating the impact energy throughout the body 22 of the vehicle 12. The torque boxes 42 each are joined to one of the opposed shock towers 40. Casting the torque boxes 42 with the shock towers 40 and the mid rails 32 improves manufacturing efficiency by reducing an amount machining needed to form the front end 20 of the vehicle 12. That is, the torque boxes 42 is shaped in such a manner that is formed through casting more easily than another manufacturing process, e.g., stamping, forging, etc. The torque boxes 42 thus are shaped for specific energy absorption characteristics and formed in the casting process.

Figure 6:
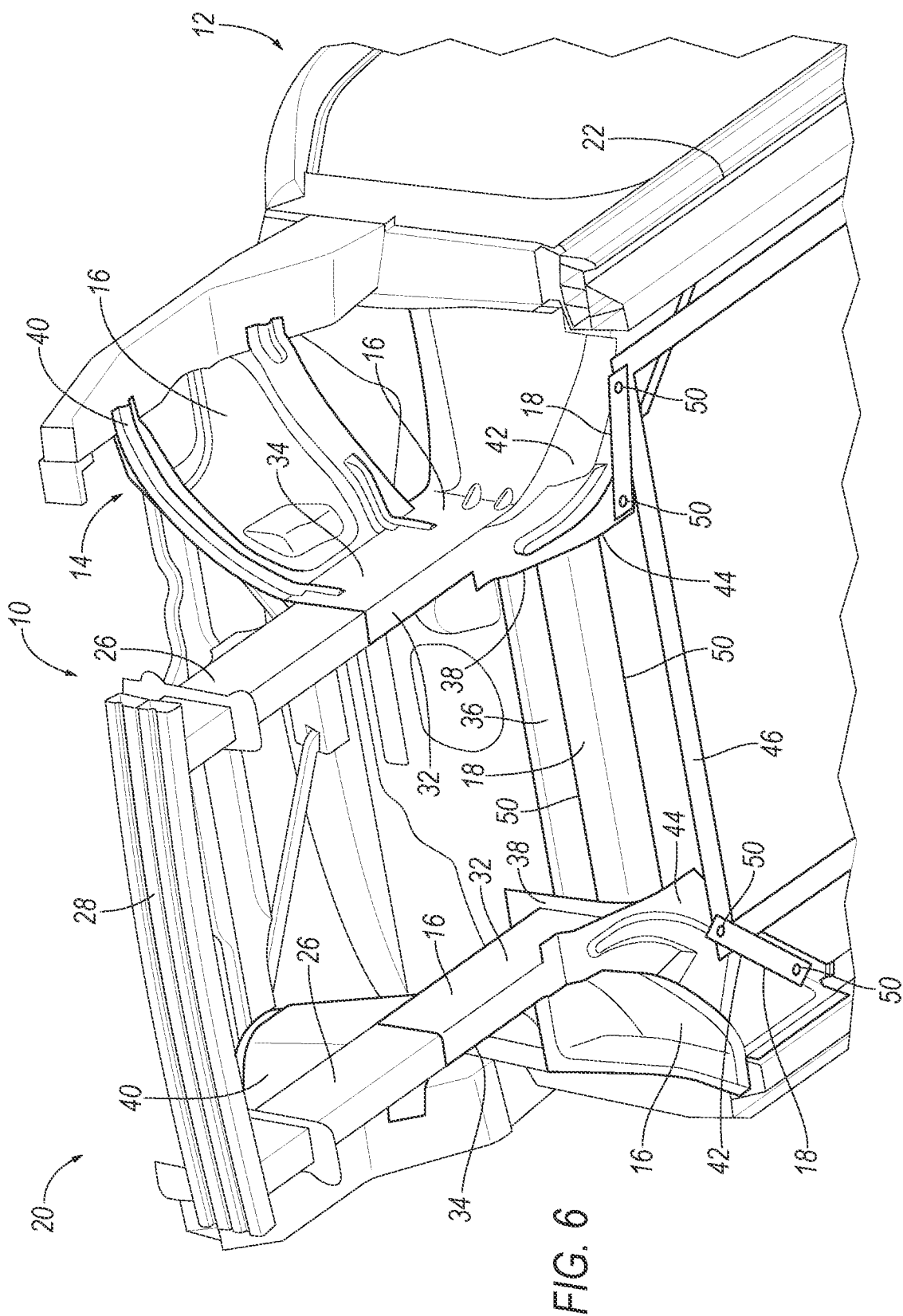
FIG. 6 is a perspective view of the hybrid structural assembly.

The structure components 16 can further include a pair of opposed rail kickdowns 44. A "rail kickdown" 44 is a component that extends from a mid rail 32 to connect the mid rail 32 to another component 16. Each kickdown 44 is joined to one of the mid rails 32. The rail kickdowns 44 connect the mid rails 32 to, e.g., the torque boxes 42, the front dash cross member 36, the shock towers 40, and the subframe 24, among other components. For example, as shown in FIG. 6, the front dash cross member 36 extend between and is configured to be joined to the opposed rail kickdowns 44. Thus, energy from the mid rails 32 is transferred through the rail kickdowns 44 to the front dash cross member 36.

Referring to FIG. 6, the vehicle may also include a battery cage 46. The battery cage 46 stores a battery (not shown) used in an electric propulsion, e.g., an electric motor in a fully electric vehicle, or a motor in a hybrid-electric vehicle, among others. The battery cage 46 absorbs energy that would otherwise be absorbed by the battery. The battery cage 46 is connected to the casting 14, and the battery cage 46 absorbs energy transferred by the casting 14 during the vehicle impact.

Figure 3:
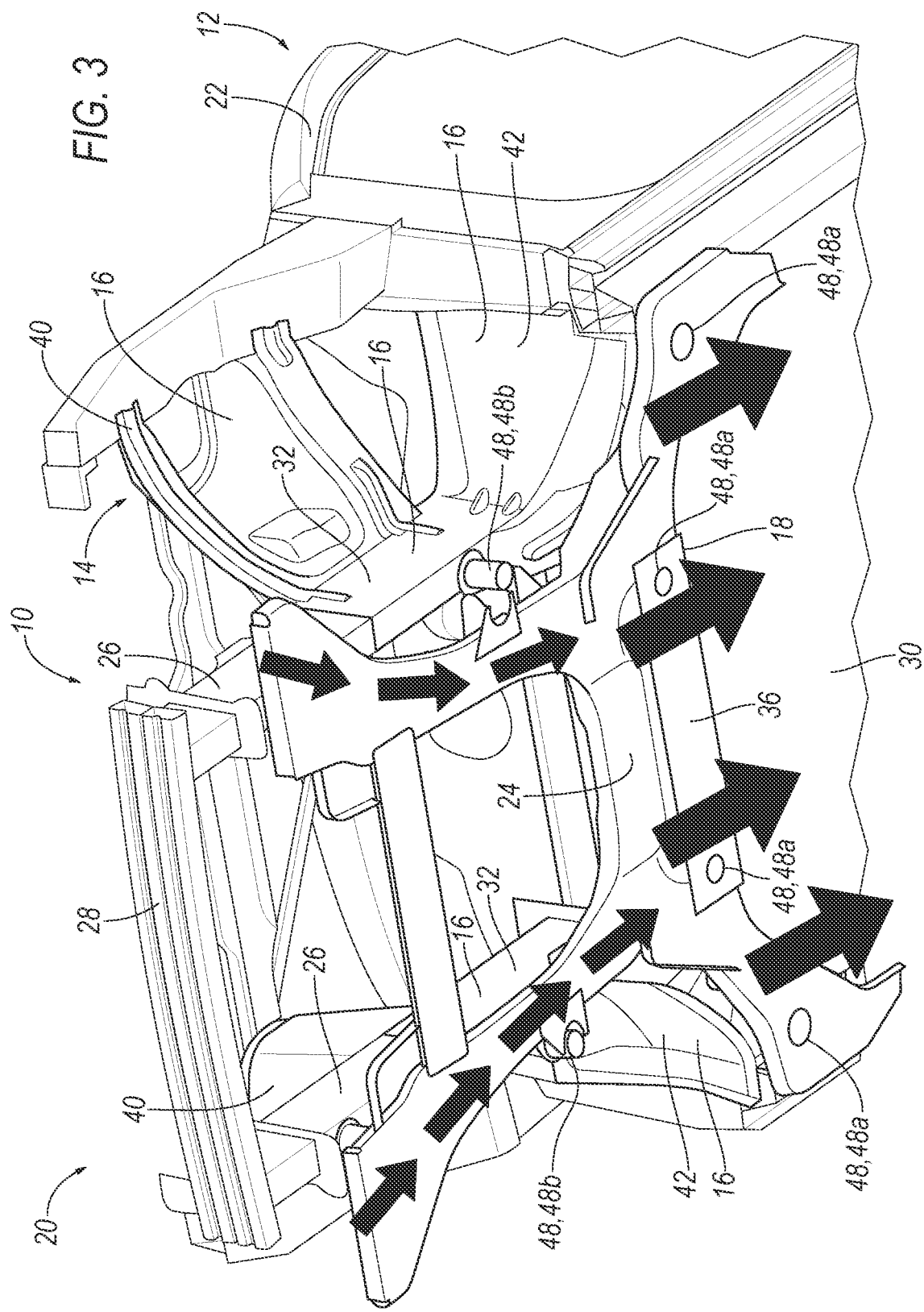
FIG. 3 is a perspective view of a subframe of the motor vehicle.

Referring to FIG. 3, the casting 14 is secured to the subframe 24 via one or more subframe mounts 48, including subframe rear mounts 48a and subframe middle mounts 48b. The rear mounts 48a and the middle mounts 48b attach the subframe 24 to the casting 14, allowing the subframe 24 to absorb energy from the casting 14. For example, the rear mounts 48a secure the front dash cross member 36 of the casting 14 to the subframe 24. By securing the subframe 24 to the casting 14 with the rear mounts 48a, the subframe 24 absorbs more energy during the vehicle impact than without the rear mounts 48a. In another example, the middle mounts 48b secure the casting 14 to the subframe 24.

Referring back to FIG. 1, the hybrid structural assembly 10 includes at least one structural inlay 18. The structural inlay 18 is secured to at least one of the structural components 16 of the casting 14. The structural inlay 18 is formed of a material having at least one of a higher ductility and a higher toughness than the cast-allowable alloy material. That is, the structural inlay 18 can provide additional energy absorption to the casting 14 based on the material used to form the structural inlay 18. That is, as described above, the casting 14 forms structural load paths and extend in a plurality of directions in 3D space, and the structural inlay 18 absorbs energy along the structural load paths.

The structural inlay 18 can be, e.g., one of a steel material or a composite material. When the structural inlay material has a higher ductility and/or toughness than the cast-allowable alloy material, the structural inlay 18 can improve energy absorption of the hybrid structural assembly 10 compared to the casting 14 alone. That is, the structural inlays 18 absorb energy that would otherwise be absorbed by the casting 14, reducing the deformation and energy absorption of the components 16 of the casting 14 and increasing the total amount of energy absorbed by the hybrid structural assembly 10. With the structural inlays 18, the hybrid structural assembly 10 has the manufacturing advantages of the casting 14 and the energy absorption advantages of higher ductility and/or higher toughness structural inlays 18.

Figure 9:
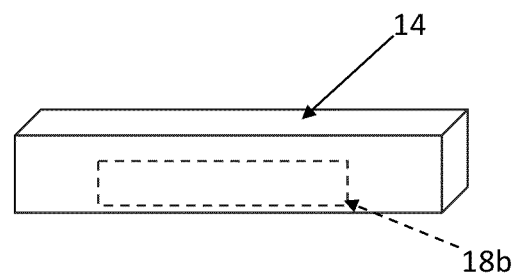
FIG. 9 is a perspective view of another structural inlay according to the principles of the present disclosure.

With reference to FIG. 9, the structural inlay 18b is embedded or cast-in with the casting 14. That is, the structural inlay 18 is embedded with the casting 14, i.e., inserted into the mold while the liquid or semisolid material flows into the mold such that the casting 14 hardens around the structural inlay 18. Alternatively, the structural inlay 18 is cast into a cavity of the casting 14, i.e., the casting 14 may include a mold for the structural inlay 18, and after the casting 14 had hardened, molten or semisolid material of the structural inlay 18 is inserted into the mold for the structural inlay 18, which forms the structural inlay 18 upon hardening.

Figure 8:
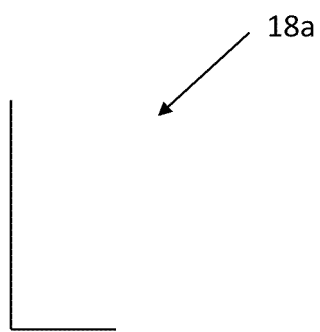
FIG. 8 is an end view of another structural inlay according to the principles of the present disclosure.

The structural inlay 18 defines a shape specified to the manufacturing and/or energy absorption characteristics of the motor vehicle 12. For example, the structural inlay 18 defines a flat plate configuration as illustrated herein. In another example, as shown in FIG. 8, structural inlay 18a may have L-Shape. Alternatively, not shown in the Figures, the structural inlay defines another geometric cross-sectional shape, e.g., a C-Shape, a U-Shape, or a polygonal shape, among others, that is suitable for the hybrid structure assembly 10. That is, the shape of the structural inlay 18 is selected based on the shape of the structural component 16 to which the structural inlay 18 is secured. The structural inlay 18 is formed into the shape via, e.g., stamping, casting, or forging, among others.

Figure 4:
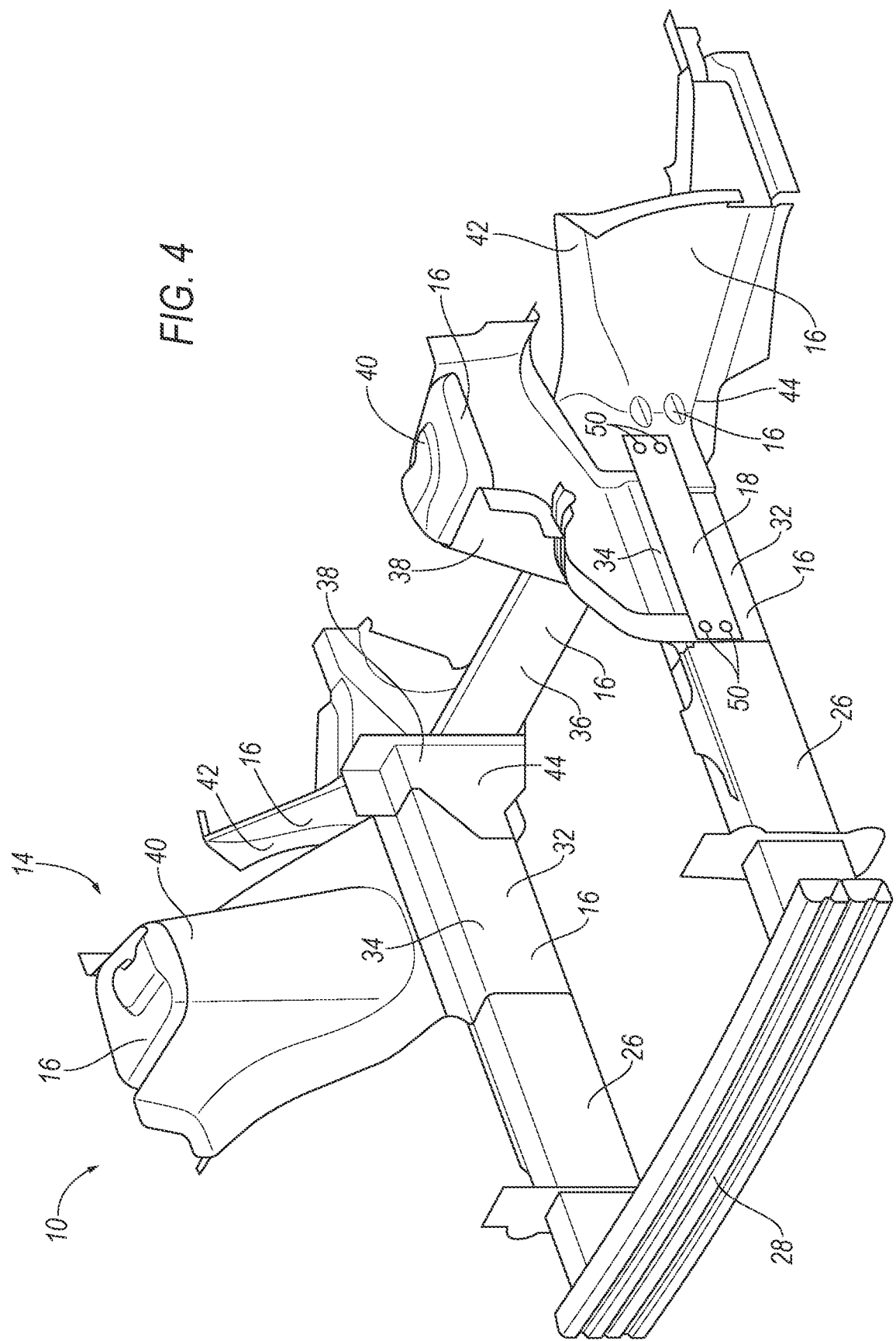
FIG. 4 is a perspective view of the hybrid structural assembly.
Figure 5:
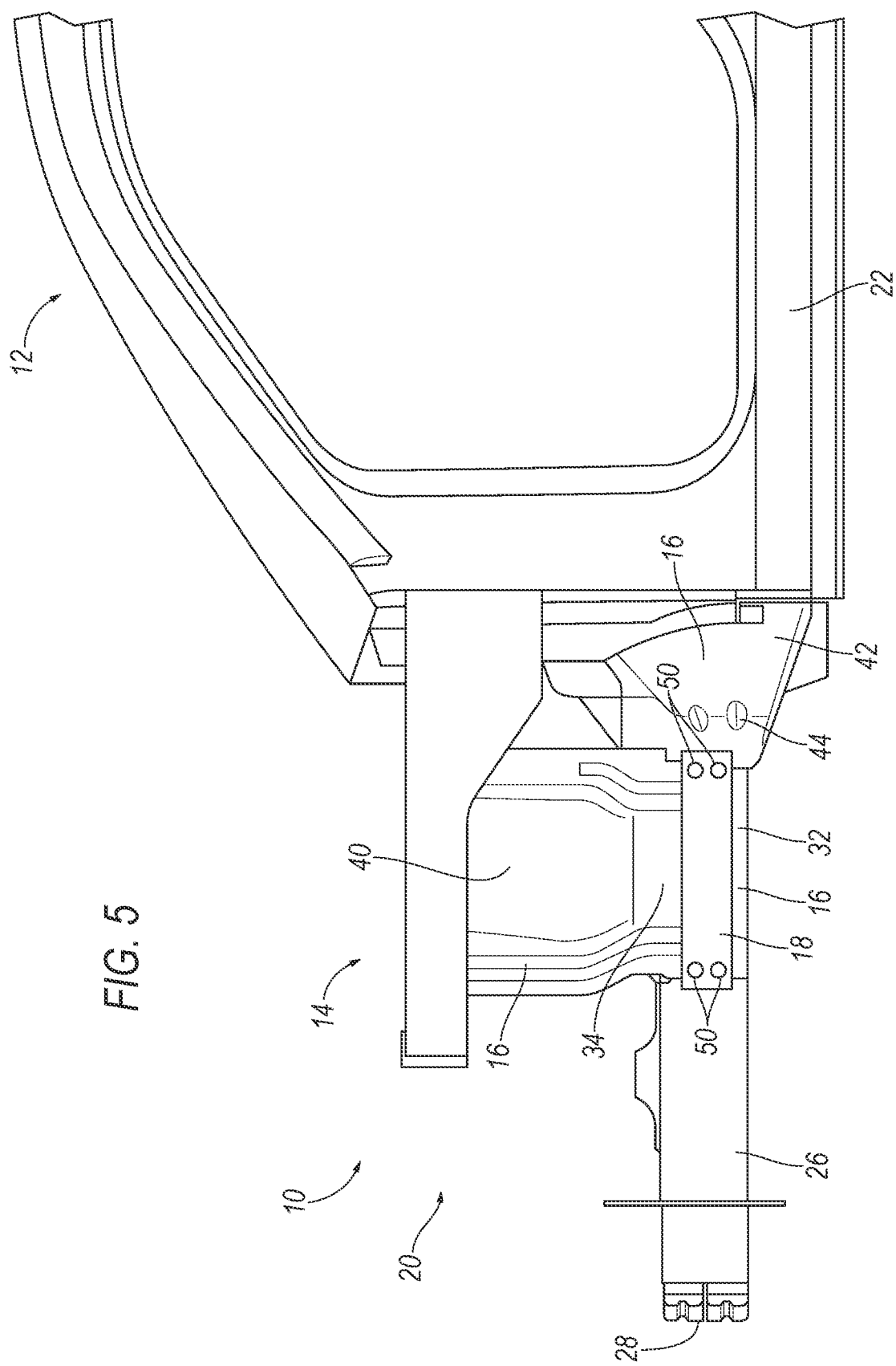
FIG. 5 is a side view of the hybrid structural assembly.
Figure 7:
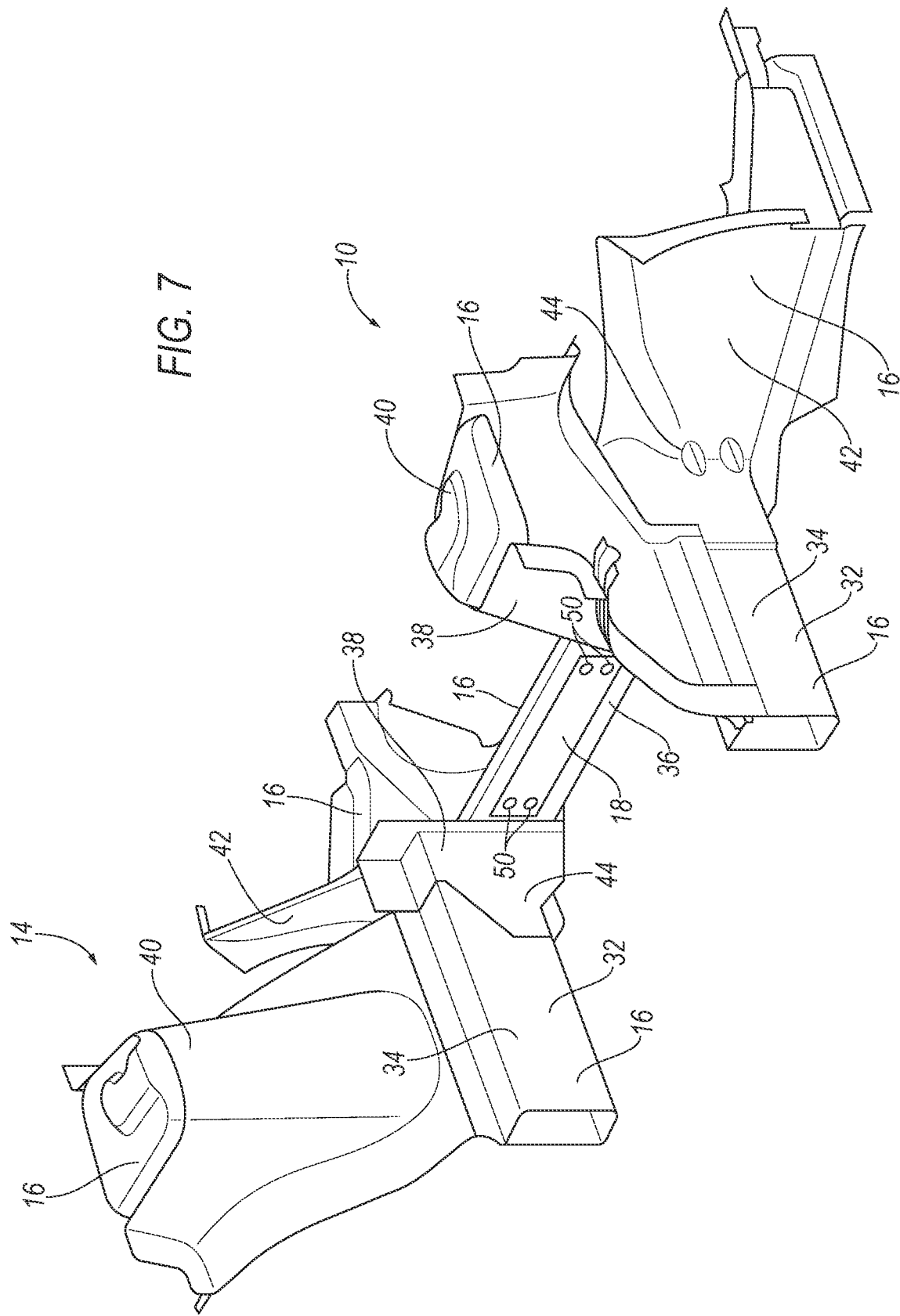
FIG. 7 is a perspective view of the hybrid structural assembly.

Referring to FIGS. 4-5, one or more structural inlays 18 is secured to one or more of the components 16 of the casting 14. For example, the structural inlays 18 is secured to each of the opposed mid rails 32. In yet another example, the structural inlay 18 is secured to a web 34 of at least one of the mid rails 32, as shown in FIGS. 4-5. In yet another example, a portion of where the structural inlay 18 is secured to the portion of the front dash cross member 36 is also secured to one of a subframe rear mount 48 or an external member of the battery cage 46, as shown in FIGS. 3 and 6. In yet another example, the structural inlay 18 is secured between the rail kickdown gussets 38, as shown in FIG. 7. The structural inlays 18 is secured to components 16 to absorb energy from the components 16 during the vehicle impact. For example, the structural inlays 18 is secured to components 16 that deform during, e.g., an oblique impact test. The structural inlays 18 thus reduces deformation of the components 16 during a vehicle impact by the higher ductility and/or toughness of the material of the structural inlays 18 than the cast-allowable material of the casting 14.

Referring to FIGS. 4-5, the structural inlay 18 is secured to the structural component 16 with a suitable fastener 50. The fastener 50 is one or more of, e.g., a mechanical fastener, an adhesive, a rivet (such as a self-piercing rivet), a screw (such as a flow drill screw), among others. For example, the structural inlay 18 is secured to the web 34 of the mid rail 32 with rivets. The fasteners 50 are selected based on the energy absorption characteristics of the structural component 16 to which the structural inlay 18 is secured. That is, the point at which the fasteners 50 secure the structural inlay 18 to the structural component 16 absorbs more energy than other portions of the structural component 16, and the fastener 50 is selected to transfer the energy without deformation to the structural inlay 18 during the impact.

Casting components 16 of a vehicle 12 provides energy absorption characteristics during a vehicle impact that reduce deceleration pulses and intrusions, complementing restraint systems for occupants in a passenger cabin. That is, the casting 14 uses empty space in a front end 20 of the vehicle 12 to absorb energy during the impact, reducing overall energy transferred from the front end 20 of the vehicle 12 to other components 16 of the vehicle 12. Thus, by using available space in the front end 20 for energy absorption by the components 16, overall weight of the vehicle can be reduced while satisfying impact tests for front end and oblique impact collisions.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A hybrid structural assembly for a motor vehicle, the hybrid structural assembly comprising:
    a casting comprising a plurality of structural components joined together in a casting process to form structural load paths and extending in a plurality of directions in a 3D space, the casting comprising a cast-allowable alloy material; and
    at least one structural inlay secured to at least one of the structural components, the at least one structural inlay comprising a material having at least one of a higher ductility and a higher toughness than the cast-allowable alloy material,
    wherein the casting comprises a front end of the motor vehicle and the plurality of structural components comprises mid rails adapted to be secured to front rails, and the at least one structural inlay is secured to at least one of the mid rails.

2. The hybrid structural assembly according to claim 1, wherein the at least one structural inlay is one of a steel material or a composite material.

3. The hybrid structural assembly according to claim 1, wherein the at least one structural inlay defines a flat plate configuration.

4. The hybrid structural assembly according to claim 1, wherein the at least one structural inlay is secured to the at least one structural component with one or more of: a mechanical fastener, an adhesive, a rivet, or a screw.

5. The hybrid structural assembly according to claim 1, wherein the at least one structural inlay is embedded or cast-in with the casting.

6. The hybrid structural assembly according to claim 1, wherein:
    the plurality of structural components comprises a front dash cross member, and
    the at least one structural inlay comprises a plurality of structural inlays, one structural inlay of the plurality of structural inlays secured to the at least one of the mid rails and another structural inlay of the plurality of structural inlays secured to at least a portion of the front dash cross member.

7. The hybrid structural assembly according to claim 6, wherein a portion of where the another structural inlay is secured to the portion of the front dash cross member is also secured between rail kickdown gussets.

8. The hybrid structural assembly according to claim 1, wherein:
    the plurality of structural components comprises a pair of rail kickdown gussets, and
    the at least one structural inlay comprises a plurality of structural inlays, one structural inlay of the plurality of structural inlays secured to the at least one of the mid rails and another structural inlay of the plurality of structural inlays secured between the rail kickdown gussets.

9. The hybrid structural assembly according to claim 1, wherein the cast-allowable alloy material is one of an aluminum alloy, a fiber-reinforced aluminum, or a fiber-reinforced magnesium.

10. The hybrid structural assembly according to claim 1, wherein the structural inlay defines one of: an L-Shape or a polygonal shape.

11. A hybrid structural assembly for a motor vehicle, the hybrid structural assembly comprising:
    a casting comprising a plurality of structural components joined together to form structural load paths and extending in a plurality of directions in a 3D space, the structural components comprising opposed mid rails joined to opposed shock towers, opposed torque boxes joined to the opposed shock towers, opposed rail kickdowns joined to the mid rails, and a front dash cross member extending between and configured to be joined to the opposed rail kickdowns; and
    at least one structural inlay secured to at least one of the structural components, the structural inlay comprising a material having a higher ductility and a higher toughness than a material of the casting.

12. The hybrid structural assembly according to claim 11, wherein the material of the casting is one of an aluminum alloy, a fiber-reinforced aluminum, or a fiber-reinforced magnesium.

13. The hybrid structural assembly according to claim 11, wherein the structural inlay is one of a steel material or a composite material.

14. The hybrid structural assembly according to claim 11, comprising structural inlays secured to each of the opposed mid rails and at least one structural inlay secured to the front dash cross member.

15. The hybrid structural assembly according to claim 11, wherein the structural inlay is embedded or cast-in with the casting.

16. A hybrid structural assembly for a motor vehicle, the hybrid structural assembly comprising:
   a casting comprising a plurality of structural components joined together to form structural load paths and extending in a plurality of directions in a 3D space, the structural components comprising opposed mid rails joined to opposed shock towers, opposed torque boxes joined to the opposed shock towers, opposed rail kickdowns joined to the mid rails, and a front dash cross member extending between and configured to be joined to the opposed rail kickdowns; and
   structural inlays secured to each of the opposed mid rails and at least one structural inlay secured to the front dash cross member, the structural inlays comprising a material having a higher ductility and a higher toughness than a material of the casting.

17. The hybrid structural assembly according to claim 16, wherein the material of the casting is one of an aluminum alloy a fiber-reinforced aluminum, or a fiber-reinforced magnesium.

18. The hybrid structural assembly according to claim 16, wherein the structural inlays are one of a steel material or a composite material.

19. The hybrid structural assembly according to claim 16, wherein a portion of where the structural inlay secured to the front dash cross member is also secured between the opposed rail kickdowns.

* * * * *